(12) United States Patent
Lefebvre et al.

(10) Patent No.: US 9,803,719 B2
(45) Date of Patent: Oct. 31, 2017

(54) CONNECTION DEVICE WHICH IS DISPLACEABLE AND REMOVABLE ALONG A ROPE

(71) Applicant: ETABLISSEMENTS SIMOND, Les Houches (FR)

(72) Inventors: Patrick Lefebvre, Chamonix Mont Blanc (FR); Mathieu Mansuy, La Bresse (FR); Romain Molliex, Scionzier (FR)

(73) Assignee: ETABLISSEMENTS SIMOND, Les Houches (FR)

( * ) Notice: Subject to any disclaimer, the term of this patent is extended or adjusted under 35 U.S.C. 154(b) by 220 days.

(21) Appl. No.: 14/506,173

(22) Filed: Oct. 3, 2014

(65) Prior Publication Data
US 2015/0096152 A1 Apr. 9, 2015

(30) Foreign Application Priority Data

Oct. 7, 2013 (FR) ...................................... 13 59722

(51) Int. Cl.
*F16B 45/02* (2006.01)
*F16G 11/04* (2006.01)
*A62B 35/00* (2006.01)
*A62B 1/14* (2006.01)

(52) U.S. Cl.
CPC ........ *F16G 11/048* (2013.01); *A62B 35/0081* (2013.01); *F16B 45/02* (2013.01); *A62B 1/14* (2013.01); *Y10T 24/3413* (2015.01)

(58) Field of Classification Search
CPC ...... F16G 11/048; F16B 45/02; F16B 45/025; F16B 45/04; F16B 45/06; F16B 45/00; A62B 1/14; A62B 35/0081; A62B 1/08; A62B 35/00; Y10T 24/3413; A63B 29/02
USPC ........ 24/327, 375, 370, 265 H; 403/83, 220; 248/514, 512, 67.7, 74.2; 292/82.2, 292/82.11, 82.1, 82.12, 82.19
See application file for complete search history.

(56) References Cited

U.S. PATENT DOCUMENTS

D628,873 S * 12/2010 Kelleghan ...................... D8/356

FOREIGN PATENT DOCUMENTS

| EP | 2333359 A1 | 6/2011 |
| FR | 2954912 A1 | 7/2011 |
| JP | 2011200640 A | 10/2011 |
| NL | 23659 | 2/1931 |
| WO | 2005044383 A1 | 5/2005 |
| WO | 2007080316 A2 | 7/2007 |

* cited by examiner

Primary Examiner — Jack W Lavinder
(74) Attorney, Agent, or Firm — William H. Eilberg (57) ABSTRACT

The connection device (1) comprises a coupling connector (5) in the form of an open ring (5a) with a closure finger (5b), which is rendered permanently integral, by means of an articulated connection or by means of a rigid connection, with a connection apparatus (4) which can ensure the selective connection to a rope (3). The manipulation of the connection device is thus facilitated, and the risks of incorrect relative positioning of the coupling connector (5) and the connection apparatus (4) are avoided.

2 Claims, 13 Drawing Sheets

FIG. 1

PRIOR ART

CONNECTION DEVICE WHICH IS DISPLACEABLE AND REMOVABLE ALONG A ROPE

TECHNICAL FIELD OF THE INVENTION

The present invention relates to devices which make it possible to provide, between a rope and a fixed point or a user, a connection which is adjustable, displaceable and removable along the rope.

A device of this type can be used in order to rise or descend up or down a rope which itself is coupled to a fixed point, or to allow a rope to pass through it and be retained adjustably and selectively, relative to a fixed point or a user.

In principle, an adjustable connection device of this type must be able to be fitted in a removable manner on the rope, and must be able to be connected in a removable manner to a fixed point.

For this purpose, the known adjustable connection devices comprise two distinct elements, i.e. an adjustable connection apparatus and a coupling connector, which elements have respective functions that differ substantially from one another.

An example of a known adjustable connection device of this type is described in document JP 2011-200640 A.

Figure 1:
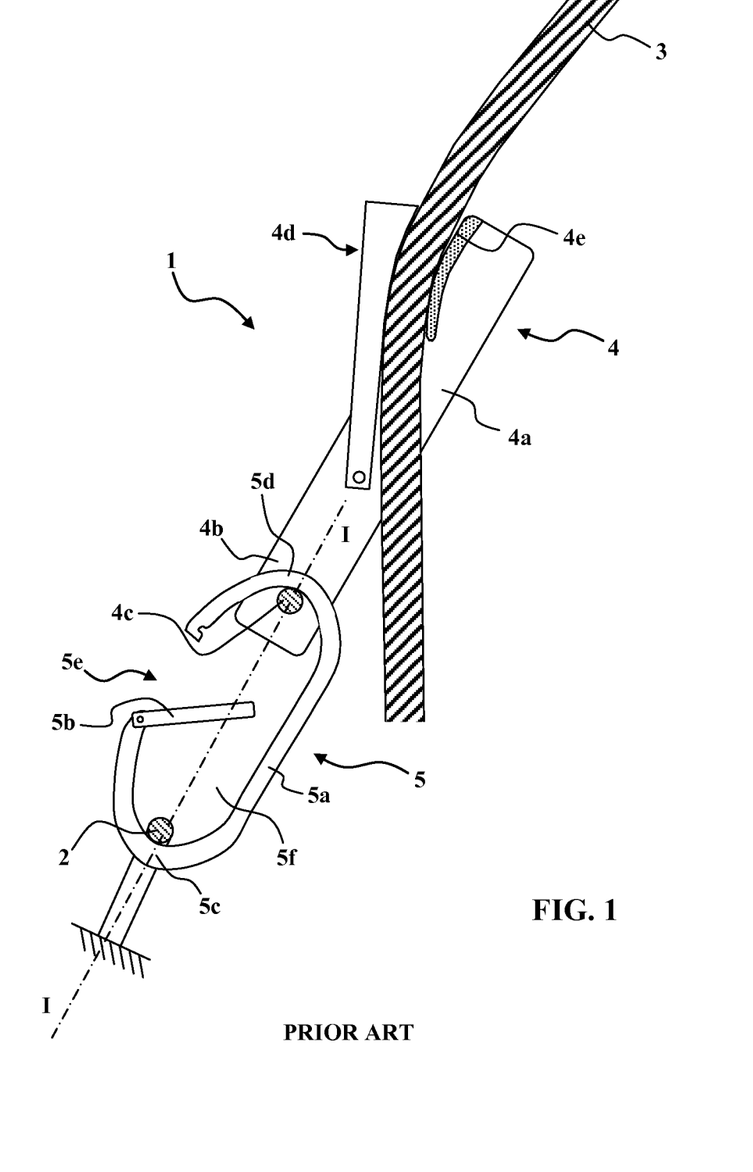
FIG. 1 illustrates schematically an adjustable connection device according to the prior art, as previously discussed.

In order to clarify the description of the problem on which the present invention is based, FIG. 1 illustrates schematically a known adjustable connection device of this type, with two distinct elements.

Thus, in FIG. 1, the connection device 1 makes it possible to connect a fixed point 2 to a rope 3, and comprises a connection apparatus 4 and a coupling connector 5.

The connection apparatus 4 permits selective and adjustable connection to the rope 3, whereas the coupling connector 5 permits selective coupling of the connection apparatus 4 to the fixed point 2.

The connection apparatus 4, which is illustrated highly schematically, comprises a connection body 4a, a proximal end 4b of which comprises first connection means 4c to connect it to the coupling connector 5, and comprises second connection means with a presser unit 4d and a support surface 4e which can provide the selective and adjustable connection of the connection body 4a to the rope 3.

The coupling connector 5 comprises a connector body 5a in the form of an open ring, and a closure finger 5b. The connector body 5a has a proximal end area 5c and a distal end area 5d opposite one another. Between its two end areas 5c and 5d, the connector body 5a comprises a lateral opening 5e. The closure finger 5b is articulated on the connector body 5a, and is mobile between firstly an open position which permits the passage into and out of an inner space 5f in the connector body 5a via its lateral opening 5e, and secondly a closed position which opposes the passage into and out of the inner space 5f in the connector body 5a via its lateral opening 5e.

In order to use a connection device 1 of this type, in principle the operator must firstly engage the rope 3 in the connection device 4, between the support surface 4e and the presser unit 4d. The operator must then connect the connection device 4 to the fixed point 2 by passing the first connection means 4c into the coupling connector 5, and by passing the fixed point 2 into the coupling connector 5. The operator must then close the closure finger 5b again and lock it correctly, for example by screwing a ring, in order to guarantee the constant connection between the fixed point 2 and the connection device 1.

A first difficulty is that, often, the operator omits to check that the closure finger 5b is correctly locked in the closure position, and there is then a risk of opening of the closure finger 5b, thus giving rise to probable loss of the connection between the fixed point 2 and the rope 3.

A second difficulty with known adjustable connection devices of this type is that the correct functioning of the connection apparatus 4 makes it necessary to control its orientation around the longitudinal axis I-I, in particular such that any curvature of the rope 3 is always on a substantially vertical plane in use. For this purpose, the user must pay constant attention to the orientation of the connection apparatus 4.

A third difficulty with known adjustable connection devices of this type is that the connection between the fixed point 2 and the rope 3 requires several manipulations in order to fit the connection apparatus 4 on the rope 3, to fit the coupling connector 5 on the fixed point 2, and to fit the coupling connector 5 on the connection apparatus 4.

SUMMARY OF THE INVENTION

A first problem to be solved by the present invention consists of designing a new adjustable connection device, which makes it possible both to reduce the number of manipulations for the connection between a fixed point and a rope, and to avoid the risks of incorrect positioning of the connection apparatus.

A second problem to be solved by the present invention consists of facilitating the manipulation of the adjustable connection device during manoeuvres of coupling to a fixed point and to the rope.

A third problem to be solved by the invention consists of increasing the security of the connection by guaranteeing the closure and locking of the coupling connector.

In order to solve the first above-mentioned problem, the invention proposes a connection device which is displaceable and removable along a rope, comprising:

a coupling connector with a connector body in the form of an open ring and a closure finger, the connector body having a proximal end area and a distal end area opposite one another, and defining between one another a direction of maximum resistance according to which the connector body can withstand a maximum traction force, the connector body having between its two end areas a lateral opening spaced from the direction of maximum resistance, the closure finger being articulated on the connector body, and mobile between firstly an open position which permits the passage into and out of an inner space in the connector body via its lateral opening, and secondly a closed position which opposes the passage into and out of the inner space in the connector body via its lateral opening, a connection apparatus with a connection body, a proximal end of which comprises first connection means for its connection to the coupling connector, with a support surface which can ensure a connection on the rope, and having a presser unit which is mobile, and designed to press the rope in an adjustable manner against the support surface;

according to the invention:

the connection apparatus is rendered permanently integral with the coupling connector, and is connected to it by the said first connection means, the said first connection means are formed such as to ensure permanently the connection and the axial orientation between the proximal end of the connection apparatus and the distal end area of the connector body.

Since the connection apparatus is rendered permanently integral with the coupling connector, and is connected to it by the first connection means, there is elimination of the constant manipulation consisting of adapting the coupling connector to the connection apparatus.

Since the first connection means ensure permanently the axial orientation of the connection apparatus at the distal end of the connector body, and since the connector body is necessarily oriented relative to a fixed point to which it is coupled, for example the harness of a user, in use the connection apparatus is necessarily oriented automatically in an appropriate manner relative to the rope, such that it can function correctly without risk of untimely blocking.

According to a first embodiment, the said first connection means can be an articulated connection, by means of which the proximal end of the connection apparatus is permanently articulated on the distal end area of the connector body.

Preferably, the said first connection means can be a rigid connection between the proximal end of the connection body and the distal end of the connector body. By means of this rigid connection, the connection apparatus and the coupling connector form a unit assembly with a common rigid body formed by the connection body and the connector body. This therefore facilitates grasping during manoeuvres of coupling to a fixed point and to a rope, thus solving the second above-mentioned problem. Simultaneously, thanks to this rigid connection, the automatic axial orientation of the connection apparatus relative to the rope is further improved.

In the case of a rigid connection of this type between the connection apparatus and the coupling connector, in order to solve the third above-mentioned problem of increasing the security of the connection, by guaranteeing the closure and locking of the coupling connector, it is advantageously possible to ensure that:

the connection apparatus comprises a connection unit which is articulated on the connection body, and is mobile between firstly a spaced position which permits the lateral engagement of the rope in a transverse gap for passage of the rope, and secondly a closed position which prevents the lateral output of the rope spaced from the transverse gap for passage of the rope, locking means ensure the selective locking of the connection unit in the closed position, the closure finger of the coupling connector is thrust by the connection unit, which retains it in the closed position when the connection unit is itself in the closed position, thus preventing its displacement to the open position for as long as the connection unit itself is in the closed position.

An adjustable connection device of this type can have various applications.

According to a first application, the connection apparatus can be a descender-belay device formed such as to ensure controlled braking along the rope.

According to a second application, the connection apparatus can be a belay device with a tubular body.

According to a third application, the connection apparatus can be a climbing system on a rope, which allows an operator to climb up a rope.

According to a fourth application, the connection apparatus can comprise a pulley for rolling on a rope.

BRIEF DESCRIPTION OF THE DRAWINGS

Other objects, characteristics and advantages of the present invention will become apparent from the following description of particular embodiments, provided in association with the appended figures, in which.

DESCRIPTION OF THE PREFERRED EMBODIMENTS

Figure 2:
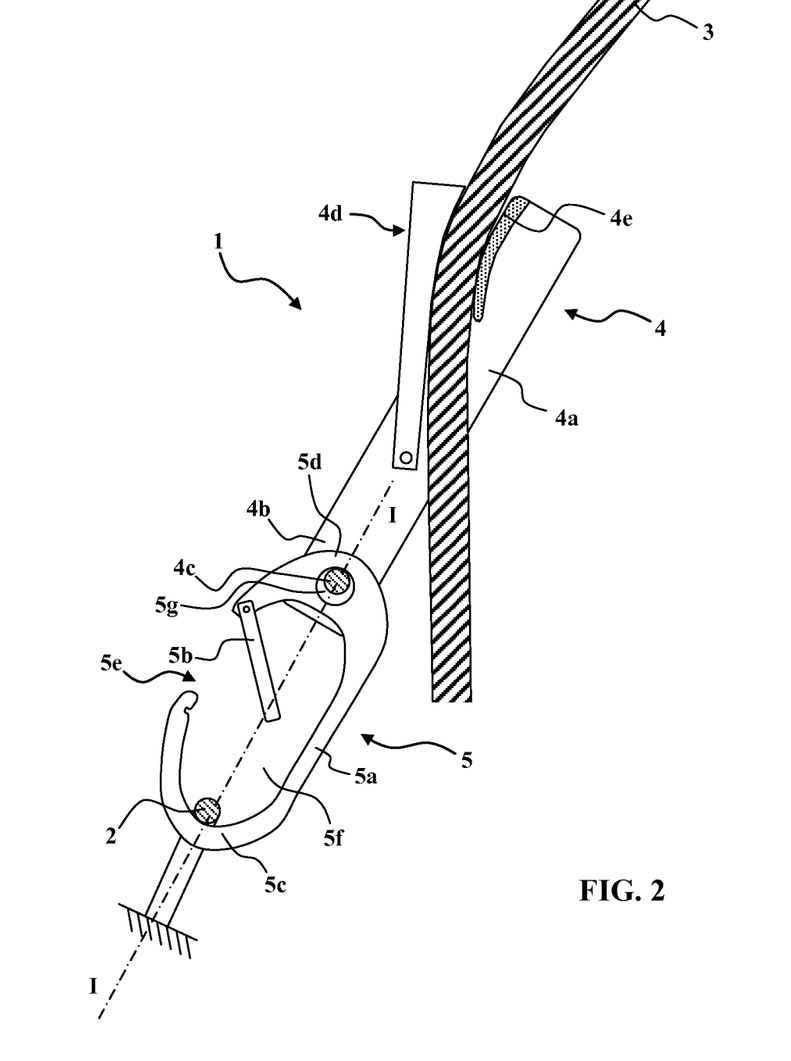
FIG. 2 is a schematic view illustrating an adjustable connection device according to a first embodiment of the present invention.

In the embodiment illustrated schematically in FIG. 2, an adjustable connection device 1 according to the invention comprises a connection apparatus 4 and a coupling connector 5.

The connection apparatus 4, which is illustrated highly schematically, comprises a connection body 4a with a proximal end 4b comprising a first connection means 4c, such as a cross-member illustrated in cross-section.

The connection apparatus 4 additionally comprises second connection means, illustrated in the form of a mobile presser unit 4d which is articulated on the connection body 4a, and is designed to press the rope 3 against a support surface 4e of the connection body 4a, in a manner which is adjustable and removable according to the wishes of the operator. The connection apparatus 4 thus provides adjustable braking on the rope 3.

The coupling connector 5 comprises a connector body 5a and a closure finger 5b. The connector body 5a extends between a proximal end area 5c and a distal end area 5d, and has a lateral opening 5e which the finger 5b closes in the closed position, and which the finger 5b leaves accessible in the open position. The coupling connector 5 illustrated in FIG. 2 differs from the one in FIG. 1 in that the distal end area 5d comprises an aperture 5g through which there pass the first connection means 4c in the form of a cross-member, of the connection body 4a. Thus, the first connection means 4c are permanently connected to the distal end area 5d of the connector body 5a.

In the conditions of use, when traction is exerted between the rope 3 and the fixed point 2, in other words during braking or blocking exerted by the connection apparatus 4, the fixed point 2 is accommodated in the proximal end area 5c of the coupling connector 5, and the coupling connector 5 is oriented automatically around the longitudinal axis I-I, which gives rise simultaneously to the axial orientation of the connection apparatus 4, i.e. to its orientation around the longitudinal axis I-I, thanks to the permanent connection between the connector body 5a and the connection apparatus 4.

Since the coupling connector 5 is permanently integral with the connection apparatus 4, the operator no longer needs to be concerned about connecting the connector 5 to the connection apparatus 4 during use of the connection device 1. This therefore reduces the number of manoeuvres necessary for use of the connection device 1, and therefore the risks of error or accident.

Figure 3:
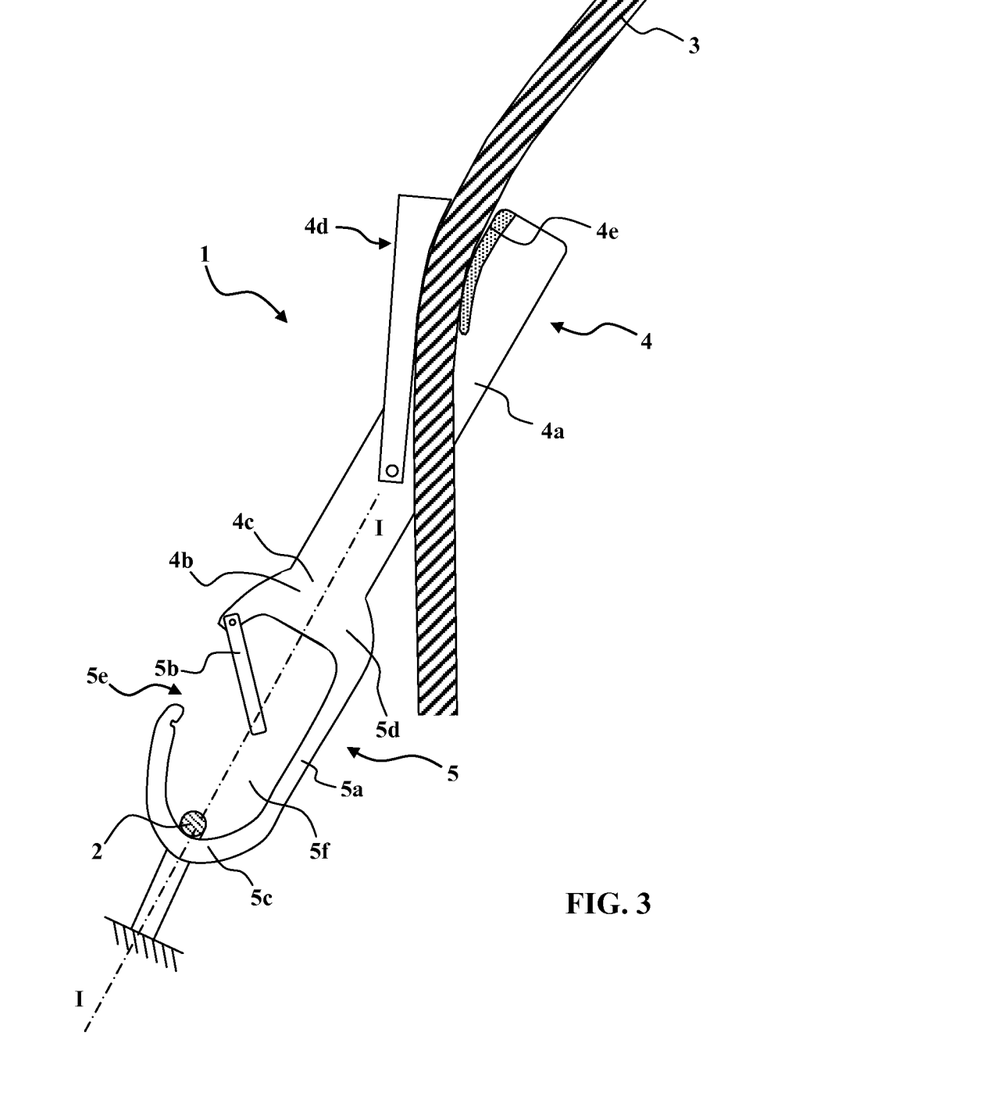
FIG. 3 is a schematic view illustrating an adjustable connection device according to a second embodiment of the invention.

The second embodiment illustrated schematically in FIG. 3 is now considered.

In this second embodiment, the adjustable connection device 1 comprises most of the means of the embodiment in FIG. 2, and these means are indicated by the same numerical references. The connection device 4 is thus shown once more with a connection body 4a, a proximal end 4b, second connection means with a presser unit 4d, and a distal support surface 4e. Once more there is a coupling connector 5 with a connector body 5a, a closure finger 5b, a proximal end area 5c, a distal end area 5d, a lateral opening 5e and an inner space 5f. In comparison with the embodiment in FIG. 2, the device in FIG. 3 is distinguished in that the first connection means 4c consist of a rigid connection, which forms a continuity between the proximal end 4b of the connection body 4a, and the distal end area 5d of the connector body 5a. By means of this rigid connection, the connection apparatus 4 and the coupling connector 5 form a unit assembly with a common rigid body, formed by the connection body 4a and the connector body 5a.

Thus, during manoeuvres of coupling to a fixed point 2 and to a rope 3, grasping of the body of the connection device 1 is facilitated, since the operator can hold the connection device 1 efficiently by means of the connection apparatus 4 during coupling of the coupling connector 5 to the fixed point 2, and the operator can hold the connection device 1 efficiently by means of the coupling connector 5 during the engagement of the rope 3 in the connection apparatus 4. Simultaneously, the rigid connection between the connection apparatus 4 and the coupling connector 5 improves further the orientation of the connection apparatus 4 around the longitudinal axis I-I.

A first practical form of the second embodiment is now considered in FIGS. 4 to 8. This first form shows again the essential elements previously indicated in FIG. 3, and these essential elements are designated by the same numerical references.

In this case, the connection body 4a is integral with a first lateral guide flange 6 for the rope and with a support surface in the form of a braking nose 4e added onto the connection body 4a. The connection body 4a is associated with a second lateral guide flange 7 for the rope which forms a connection unit. The first and second lateral guide flanges 6 and 7 for the rope are separated from one another by a transverse gap 8 for passage of the rope, which extends from a rope input 8a to a rope output 8b. The second lateral guide flange 7 for the rope is fitted such as to be mobile on the connection body 4a, between a spaced position illustrated in FIG. 8, for putting into place and removal of a rope 3, and a closed position illustrated in FIGS. 4 to 7, in which the rope 3 is trapped in the transverse gap 8 for passage of the rope.

Figure 4:
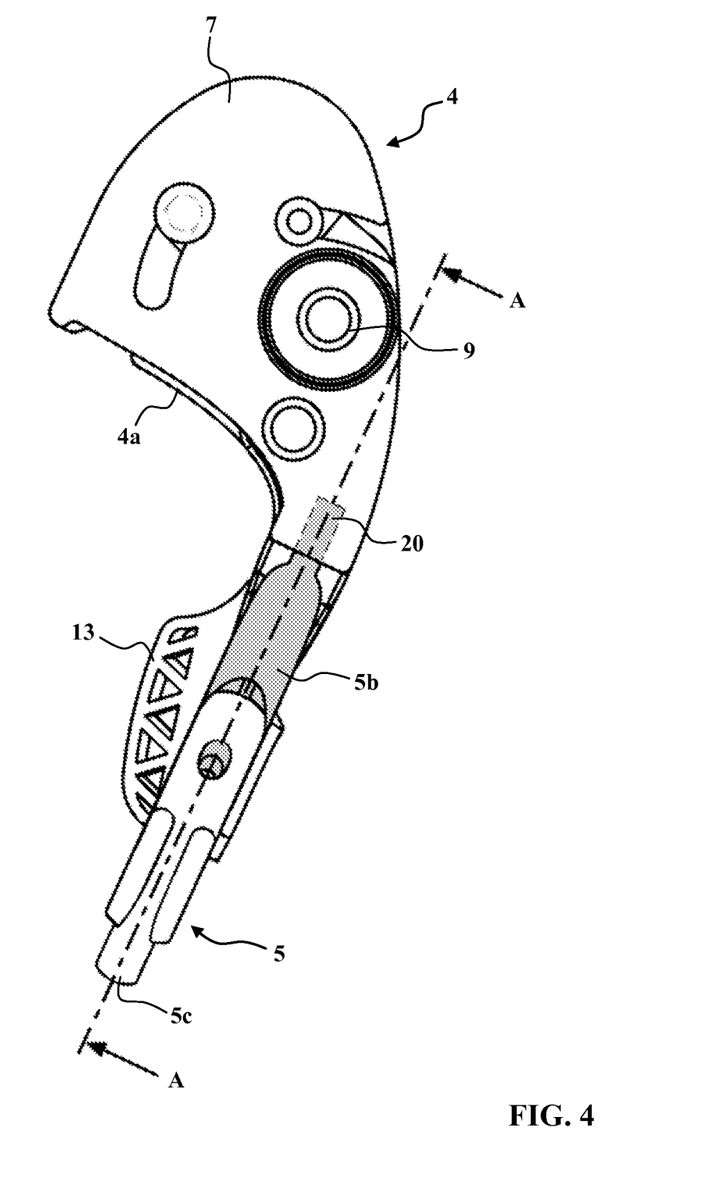
FIG. 4 is a front view illustrating in greater detail a first embodiment of a connection device according to the second embodiment, of the descender-belay device type.
Figure 5:
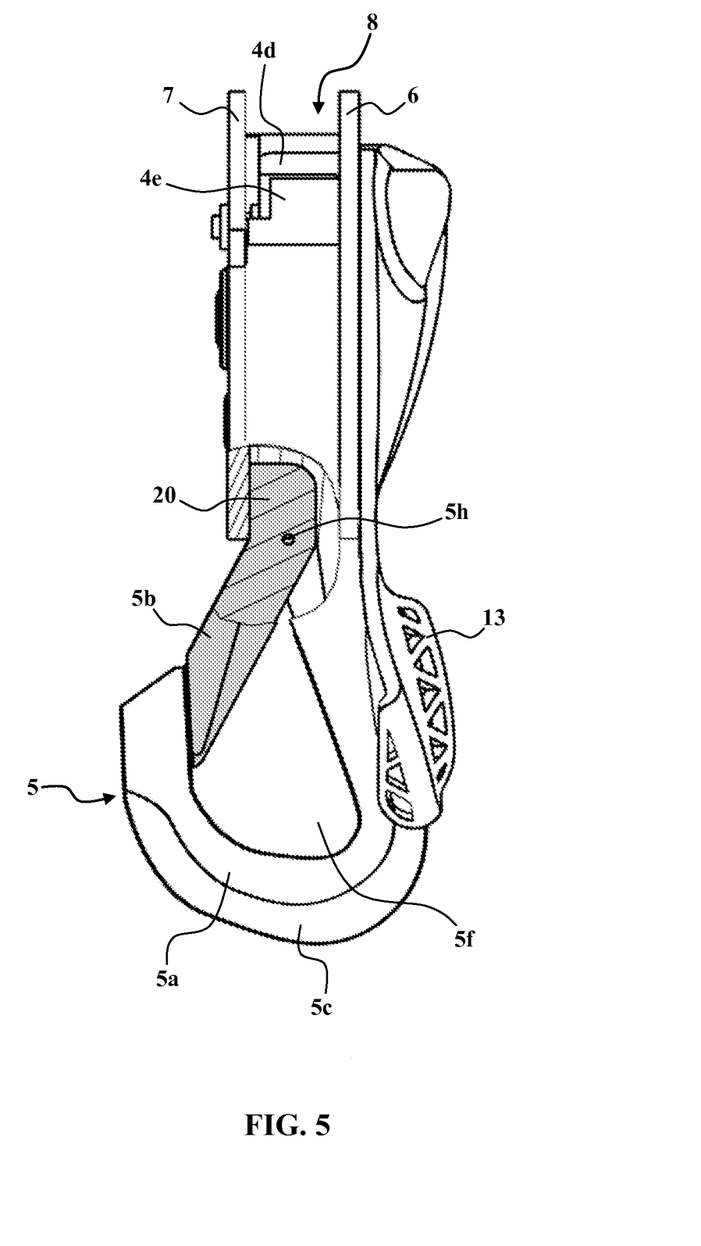
FIG. 5 is a side view in partial cross-section according to the plane A-A, illustrating the connection device in FIG. 4.

The second connection means comprise a presser unit in the form of a cam 4d, which is engaged between the first and second lateral guide flanges 6 and 7 for the rope, and is mobile in rotation around a rotational cam shaft 9, to and from the braking nose 4e, towards which it is thrust back by a return spring (not represented).

The cam 4d can be thrust away from the braking nose 4e by the action of the user on a lever 13 which is articulated on the connection body 4a.

This embodiment shows once more a coupling connector 5 which is integral with the connection body 4a, with a closure finger 5b which is articulated on a connector body 5a according to an articulation shaft 5h. The closure finger 5b is extended beyond the articulation shaft 5h by a distal section 20. Thus, during opening of the closure finger 5b by pivoting towards the inner space 5f in the connector body 5a, the distal section 20 tends to be spaced laterally from the connection body 4a.

The second lateral guide flange 7 for the rope and the distal section 20 are arranged such that, when the second lateral guide flange 7 for the rope is in the closed position, thus ensuring that the rope 3 is trapped, the second lateral guide flange 7 for the rope overlaps the distal section 20 of the closure finger 5b, and opposes the opening of the closure finger 5b, thus ensuring locking in closure of the coupling connector 5. Opening of the closure finger 5b is possible only after manoeuvring the second lateral guide flange 7 for the rope to its spaced position, in the direction which releases the rope 3. Thus, the second lateral guide flange 7 for the rope constitutes a connection unit which locks the closure finger 5b in the closed position.

Figure 8:
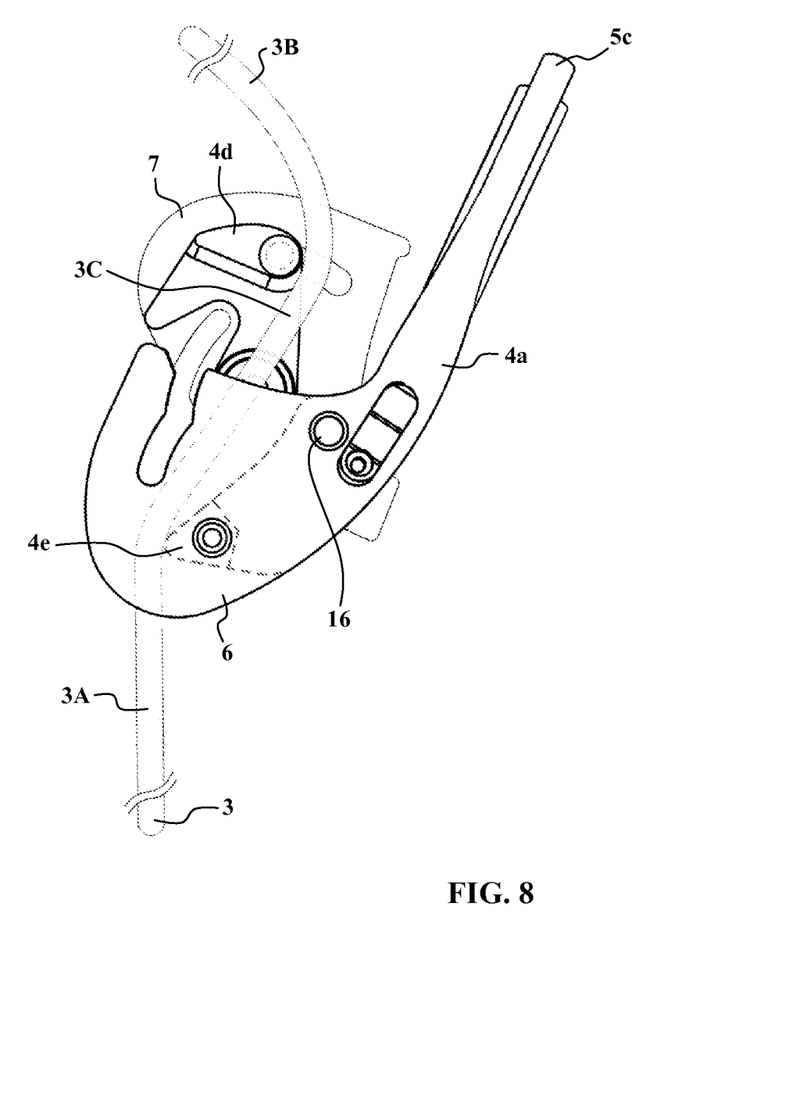

In the spaced position illustrated in FIG. 8, the second lateral guide flange 7 for the rope permits engagement of the rope 3 in the transverse gap 8 for passage of the rope, between the two lateral guide flanges 6 and 7 for the rope, and between the braking nose 4e and the cam 4d.

In the closed position illustrated in FIGS. 4 to 7, the first and second lateral guide flanges 6 and 7 for the rope prevent the lateral output of the rope 3 away from the transverse gap 8 for passage of the rope. Locking means ensure the selective locking of the second lateral guide flange 7 for the rope in the closed position.

The functioning is now illustrated with reference to FIGS. 6, 7 and 8.

Figure 6:
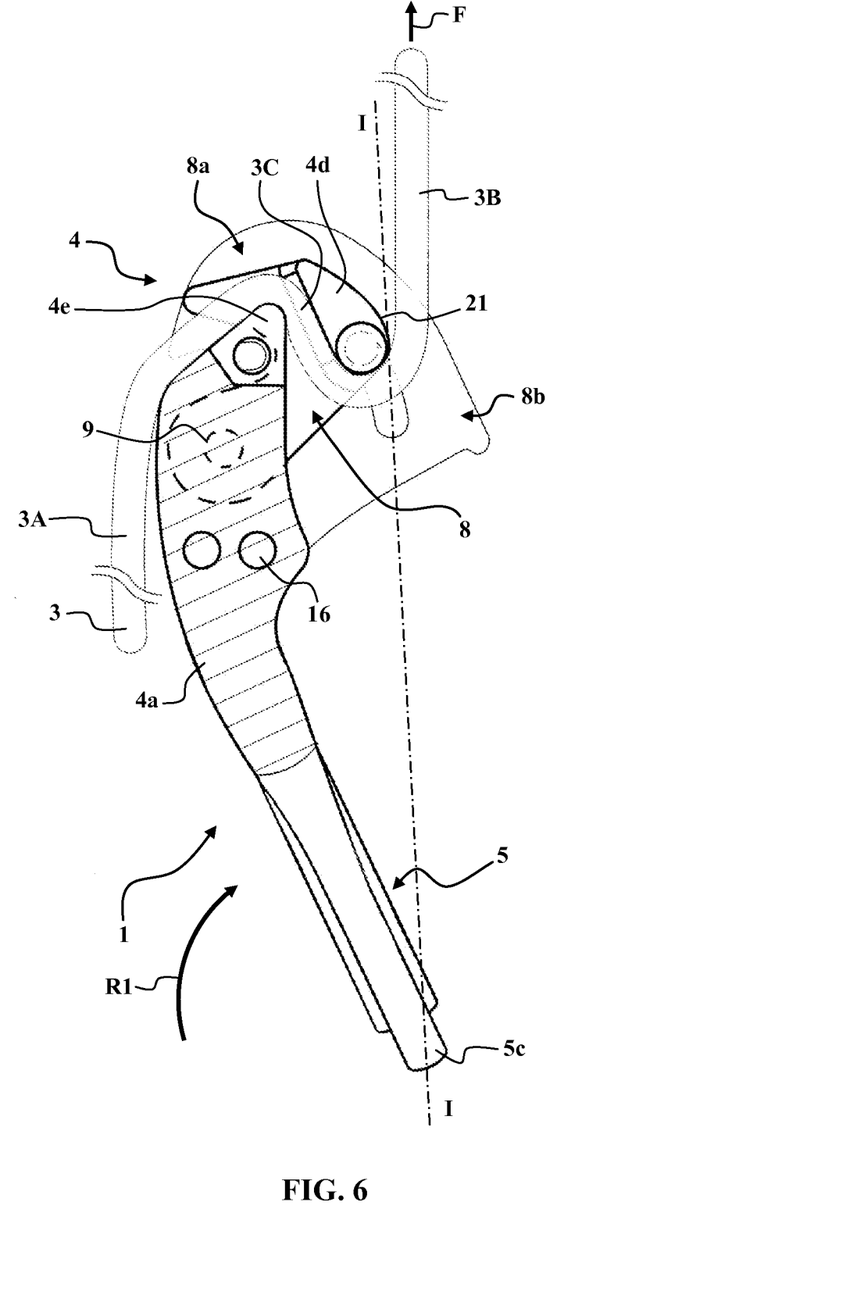
FIGS. 6 to 8 illustrate in a side view three steps of the functioning of the connection device in FIG. 4.
Figure 7:
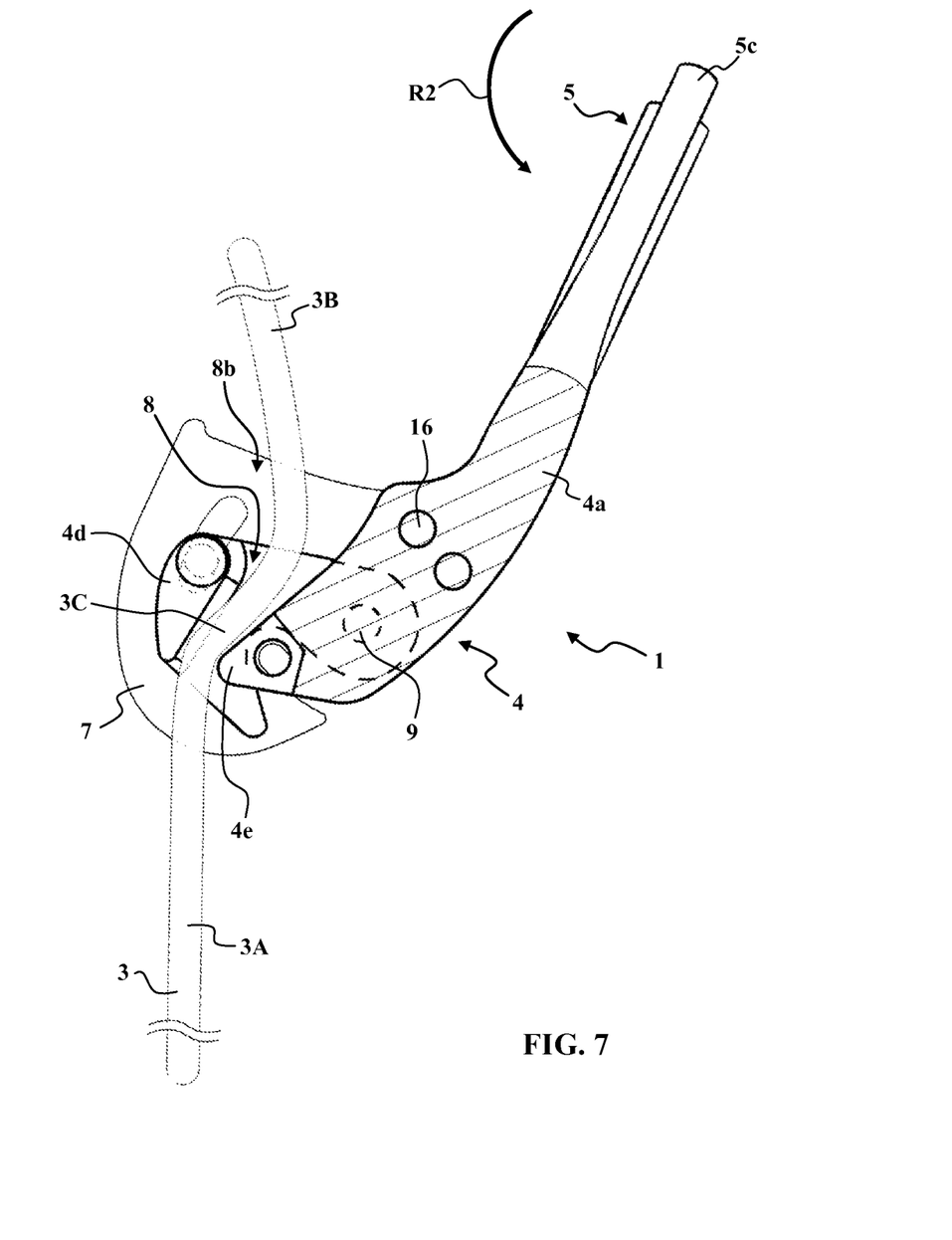

In FIG. 6, the coupling connector 5 is maintained at the bottom, whilst the tension F of the output end 3B of the rope 3 pulls the connection apparatus 4 upwards (arrow R1), such that the axis I-I which passes via the proximal end area 5c and the outer surface 21 of the cam 4d are aligned with the output end 3B of the rope 3. In this circumstance, the rope 3 passes round the cam 4d and the braking nose 4e, and tends to thrust the cam 4d towards the braking nose 4e, thus giving rise to gripping of the intermediate section 3C of rope, and efficient blocking of the rope 3. In FIG. 7, in order to release the braking of the rope 3, the connection apparatus 4 is pivoted downwards (arrow R2), such that the rope 3 no longer thrusts the cam 4d, and can therefore slide more freely between the cam 4d and the braking nose 4e, with the intermediate section 3C being substantially aligned with the output end 3B and the input end 3A of the rope 3. In FIG. 8, the second lateral guide flange 7 for the rope is pivoted to the spaced position, around a flange shaft 16, in order to permit putting into place or removal of the rope 3.

Figure 9:
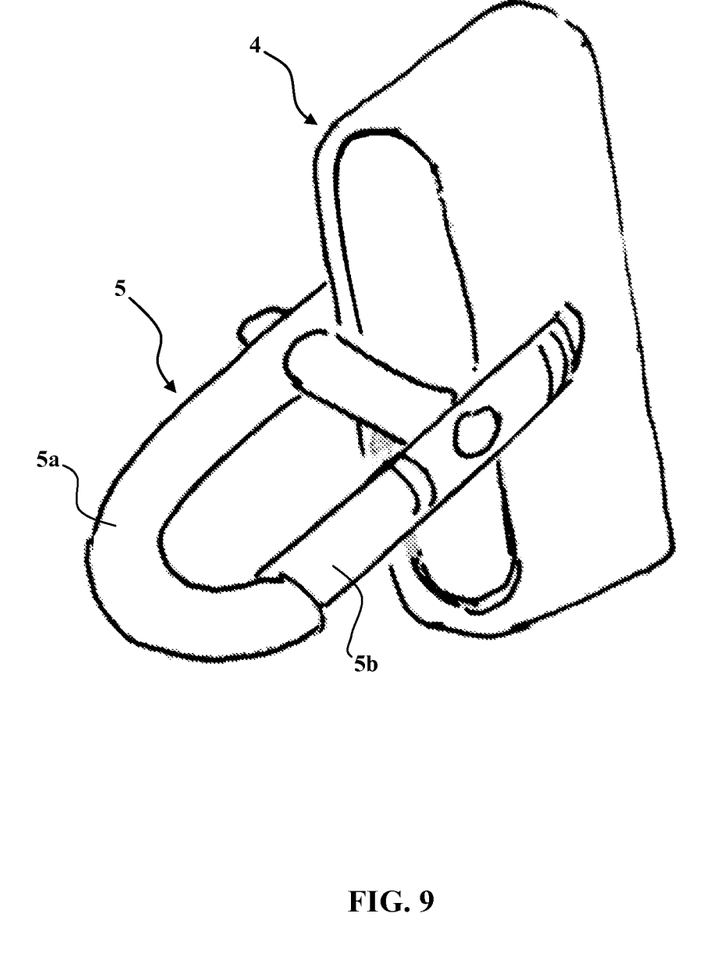
FIGS. 9 and 10 illustrate in perspective two other embodiments of a connection device according to the second embodiment, of the belay device type with a tubular body.
Figure 10:
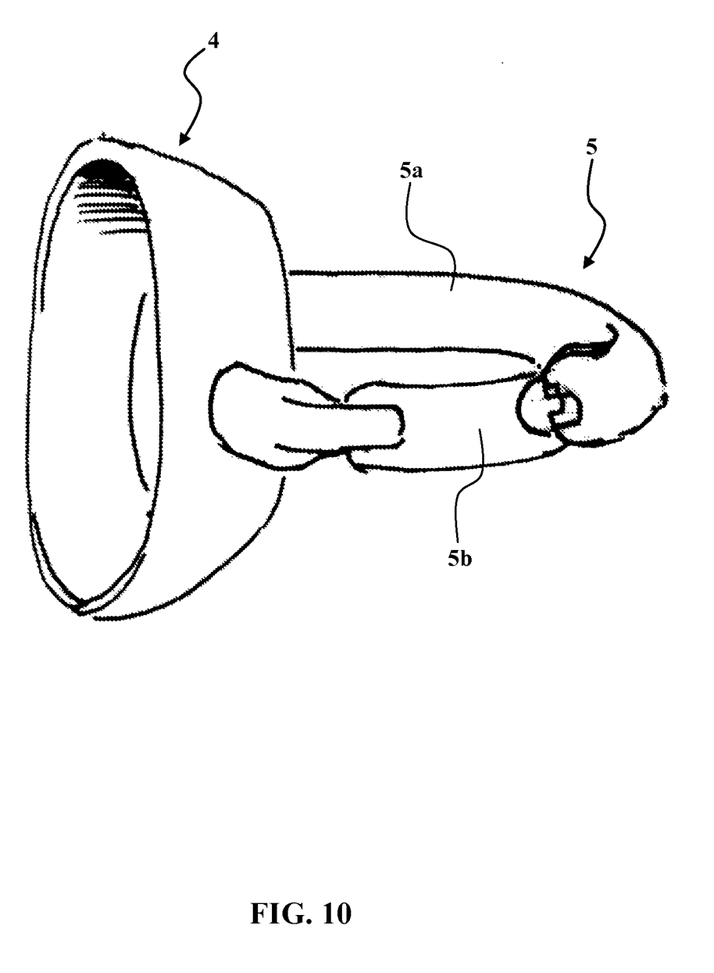

FIGS. 9 and 10 illustrate two other practical forms of the second embodiment, in which the connection apparatus 4 is in the form of a belay tube for passage of a loop of rope, and in which the coupling connector 5 comprises a connector body 5a in a single piece with the connection apparatus 4, and on which the closure finger 5b is articulated. A snap clasp, not illustrated, acts as a presser unit, in a manner known in tubular belay devices.

Figure 11:
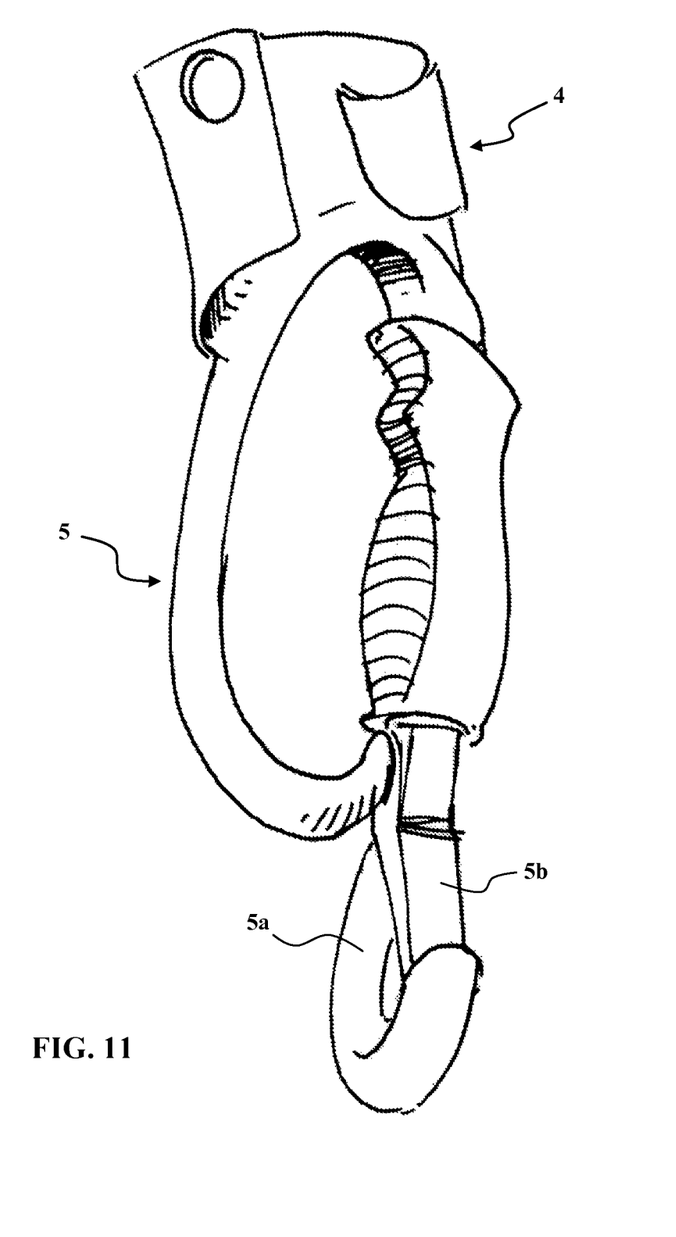
FIGS. 11 and 12 illustrate in perspective two other embodiments of a connection device according to the second embodiment, of the systems for climbing up a rope type.
Figure 12:
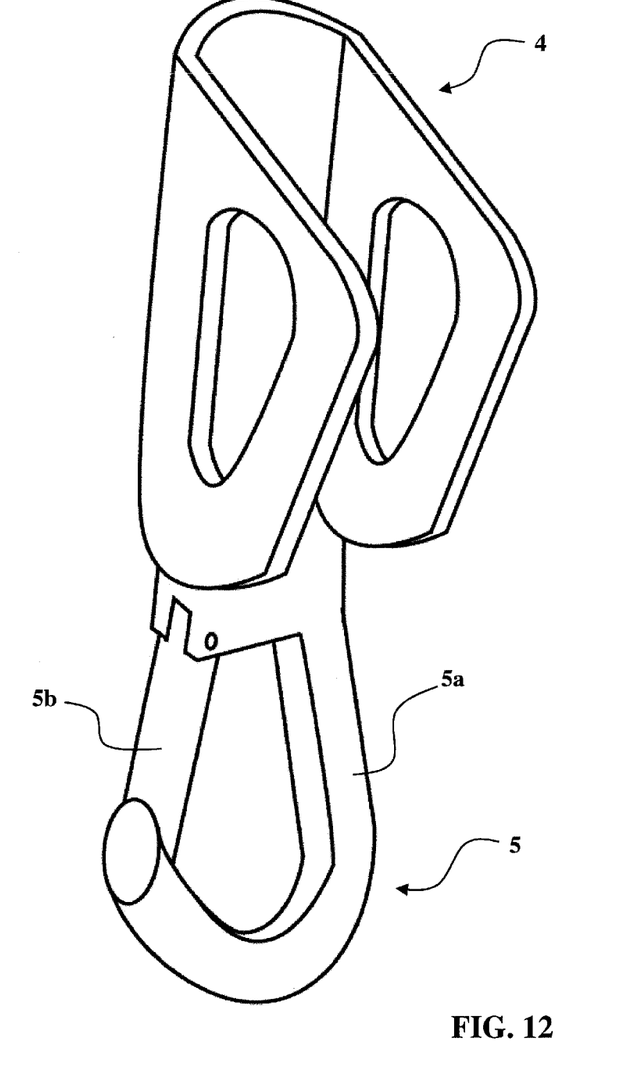

FIGS. 11 and 12 illustrate two other practical forms of the second embodiment, in which the connection apparatus 4 is in the form of a system for climbing up the rope, and in which the coupling connector 5 comprises a connector body 5a in a single piece with the connection apparatus 4, and on which a closure finger 5b is articulated.

Figure 13:
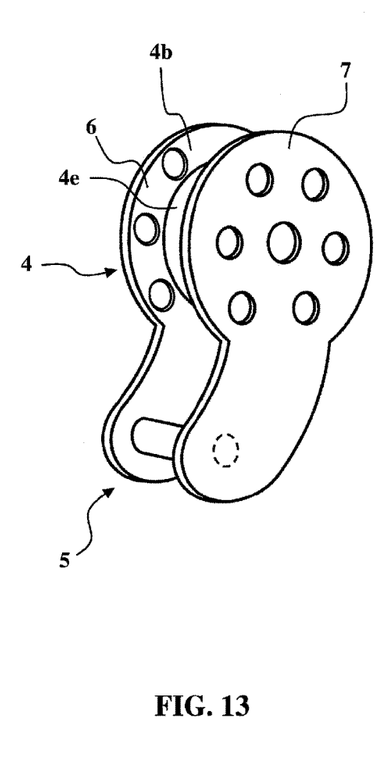
FIGS. 13 and 14 illustrate in perspective another embodiment of a connection device according to the second embodiment, of the pulley for rolling on a rope type.
Figure 14:
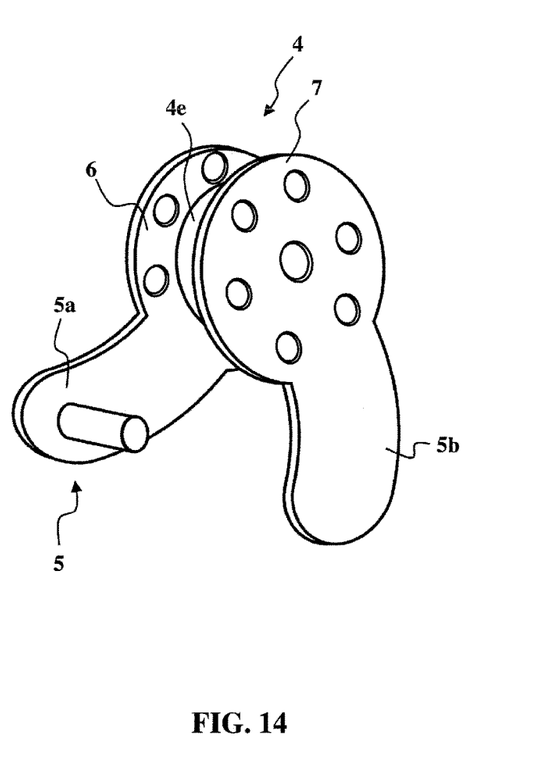

FIGS. 13 and 14 illustrate a practical form of the second embodiment, in which the connection apparatus 4 comprises a distal surface 4e in the form of a pulley for rolling on a rope, fitted between two lateral flanges 6 and 7, the lateral flange 6 being integral with the connector body 5a, and the lateral flange 7 being pivoting and integral with the closure finger 5b.

The present invention is not limited to the embodiments which have been explicitly described, but incorporates the various variants and generalisations of it contained within the scope of the following claims.

The invention claimed is:

1. A connection device which is displaceable and removable along a rope, comprising:

a coupling connector with a connector body in the form of an open ring and a closure finger, the connector body having a proximal end area and a distal end area opposite one another, and defining between one another a direction of maximum resistance according to which the connector body can withstand a maximum traction force, the connector body having between its two end areas a lateral opening spaced from the direction of maximum resistance, the closure finger being articulated on the connector body, and mobile between firstly an open position which permits the passage into and out of an inner space in the connector body via its lateral opening, and secondly a closed position which opposes the passage into and out of the inner space in the connector body via its lateral opening, a connection apparatus with a connection body, a proximal end of which comprises first connection means for its connection to the coupling connector, with a support surface which can ensure a connection on the rope, and having a presser unit which is mobile, and designed to press the rope in an adjustable manner against the support surface, wherein:

the connection apparatus is rendered permanently integral with the coupling connector, and is connected to it by the said first connection means, the said first connection means are formed such as to ensure permanently the connection and the axial orientation between the proximal end of the connection apparatus and the distal end area of the connector body, wherein the said first connection means consist of a rigid connection between the proximal end of the connection body and the distal end area of the connector body, by means of which the connection apparatus and the coupling connector form a unit assembly with a common rigid body formed by the connection body and the connector body, wherein:

the connection apparatus comprises a connection unit which is articulated on the connection body, and is mobile between firstly a spaced position which permits the lateral engagement of the rope in a transverse gap for passage of the rope, and secondly a closed position which prevents the lateral output of the rope spaced from the transverse gap for passage of the rope, locking means to ensure the selective locking of the connection unit in the closed position, the closure finger of the coupling connector is thrust by the connection unit, which retains it in the closed position when the connection unit is itself in the closed position, thus preventing its displacement to the open position for as long as the connection unit itself is in the closed position.

2. The connection device according to claim 1, wherein the connection apparatus is a descender-belay device formed such as to ensure controlled braking along the rope.

* * * * *